United States Patent [19]

Macia

[11] Patent Number: 4,826,591
[45] Date of Patent: May 2, 1989

[54] POOL SKIMMER

[75] Inventor: Narciso F. Macia, Tempe, Ariz.

[73] Assignee: Caretaker Systems, Inc., Scottsdale, Ariz.

[21] Appl. No.: 104,475

[22] Filed: Oct. 2, 1987

[51] Int. Cl.$^4$ .............................................. E04H 3/20
[52] U.S. Cl. .................................. 210/169; 210/416.2; 4/507; 4/512
[58] Field of Search ........................... 210/169, 416.2; 4/507–512

[56]  References Cited

U.S. PATENT DOCUMENTS

| | | | |
|---|---|---|---|
| 2,247,116 | 6/1941 | Day | 210/169 |
| 2,914,180 | 5/1958 | Konopka et al. | 210/169 |
| 3,297,163 | 1/1967 | Landon | 210/169 |
| 3,304,564 | 2/1967 | Green et al. | 210/169 |
| 3,765,534 | 10/1973 | West et al. | 210/169 |
| 4,503,573 | 3/1985 | Handzel | 4/507 |

Primary Examiner—Richard V. Fisher
Assistant Examiner—Coreen Y. Lee
Attorney, Agent, or Firm—LaValle D. Ptak

[57] ABSTRACT

A skimmer is provided for a swimming pool and is constructed in a manner similar to conventional skimmers for a pool so far as the water inlet and filter basket is concerned. Instead of pulling water through the filter basket to the recirculating pump for the pool, however, a water outlet is provided from the bottom of the basket holding cavity of the skimmer; and return water for supply back to the pool is provided by the recirculating pump to an entrainment nozzle device located at the bottom of the filter cavity to pull additional water through the filter cavity to mix with the return water, all of which is supplied to the water outlet located beneath the pool water surface level. Consequently, even if the filter basket should be completely clogged, the water flow through the recirculating system for the pool is not impeded, since the filter basket is not in the primary recirculating path of the pool system.

8 Claims, 1 Drawing Sheet

POOL SKIMMER

BACKGROUND

A major problem which exits with swimming pools, both commercial and residential, is keeping such pools clean. Dust, dirt and other foreign matter enters the water and settles on the bottom. In addition, leaves, bugs, feathers and the like accumulate on the water and ultimately become saturated and sink to the bottom. Modern swimming pools all employ recirculating pump systems for withdrawing water from drains located at the bottom and from skimmers located at the water surface. This water then passes through a filter which removes suspended particles from the water prior to returning the water to the pool after it has been filtered. Water circulation pumps for achieving this purpose operate for extended periods of times, in some cases continuously, throughout the life of the pool. In some systems, chemicals, such as chlorine, are injected into the return water for the pool, either prior to or after filtering of the water has been effected.

Systems have been developed for causing "automatic" cleaning of pools. The newest and most effective automatic pool cleaning systems use pop-up cleaning heads in the floor and the walls of the pool to eject water under high pressure in relatively narrow streams adjacent the pool surface to stir up any dirt and small particles which otherwise would settle to the bottom or stick to the walls of the pool. This material is placed in suspension where it is withdrawn through the drain and skimmer for circulation through the filter described above. Such automatic in-floor pool cleaning systems, have reached a very sophisticated state and are extremely effective in maintaining pool cleanliness with one primary exception.

In-floor pool cleaning systems inherently do not have a capability of handling leaves and the like. As a result, the conventional leaf skimmer continues to be a necessary part of any pool system. Leaf skimmers typically are located in a well or cavity adjacent the pool and have an inlet which is partially submerged and partially above the normal water level for the pool. The inlet has a one way pivoted floating dam in it to permit water and leaves to pass into the leaf skimmer, but the dam prevents leaves and other surface debris from passing out of the skimmer into the pool. To cause surface water to move from the pool into the skimmer, the recirculation pump normally withdraws at least a portion of the water for recirculation and filtering from the bottom of the skimmer in addition to water withdrawn from the drain in the bottom of the pool. Consequently, the water which flows through the recirculating pump is pulled through the skimmer and the skimmer leaf basket on a continuous basis.

As leaves and other debris are pulled into the leaf basket, they tend to plug up the openings in the basket and restrict the water flow through it. It is necessary to periodically empty the leaf basket to prevent substantial restriction of the water flow through it. If the leaf basket is not emptied, it is possible to completely or significantly block water flow through the basket to the recirculating pump, causing the recirculation operation to be impaired. If all of the return water were to be withdrawn through a conventional leaf skimmer, it would be possible to restrict the water flow to such an extent that damage to the pump could exist. For that reason, most pool systems cause the water withdrawn from the pool by the pump to be pulled both from the leaf skimmer and from the drain at the bottom of the pool.

It is desirable to provide a leaf skimmer which has all of the advantages of conventional leaf skimmers, but which does not interfere in any way with the recirculating water flow through the pump and filter system. Furthermore, it is desirable to provide such a leaf skimmer at little or no additional cost over conventional leaf skimmers currently employed with swimming pools.

SUMMARY OF THE INVENTION

It is an object of this invention to provide an improved pool cleaning system.

It is another object of this invention to provide an improved skimmer for swimming pools.

It is an additional object of this invention to provide an improved skimmer for swimming pools which does not restrict the flow of recirculating water in the pump and filter system of the pool.

It is a further object of this invention to provide an improved skimmer operated by water returning to the pool from the filter of the recirculating system.

It is yet another object of this invention to provide an improved skimmer for a swimming pool using an ejector effect to pull water through the skimmer under control of the return water supplied to the pool from the pump and filter recirculating system.

In accordance with a preferred embodiment of this invention, a skimmer for a swimming pool includes a water inlet opening into the water in the pool. This opening is located partially below and partially above the normal surface water of the pool. Water flows from this inlet opening into a filter cavity extending below the inlet opening, with a water outlet in the bottom of the filter cavity for returning water to the pool. Return water for the pool is supplied to the water outlet in the bottom of the cavity to draw water from the water inlet of the skimmer through the cavity by means of an ejector to mix this water with the return water supplied to the pool.

DETAILED DESCRIPTION

Figure 1:
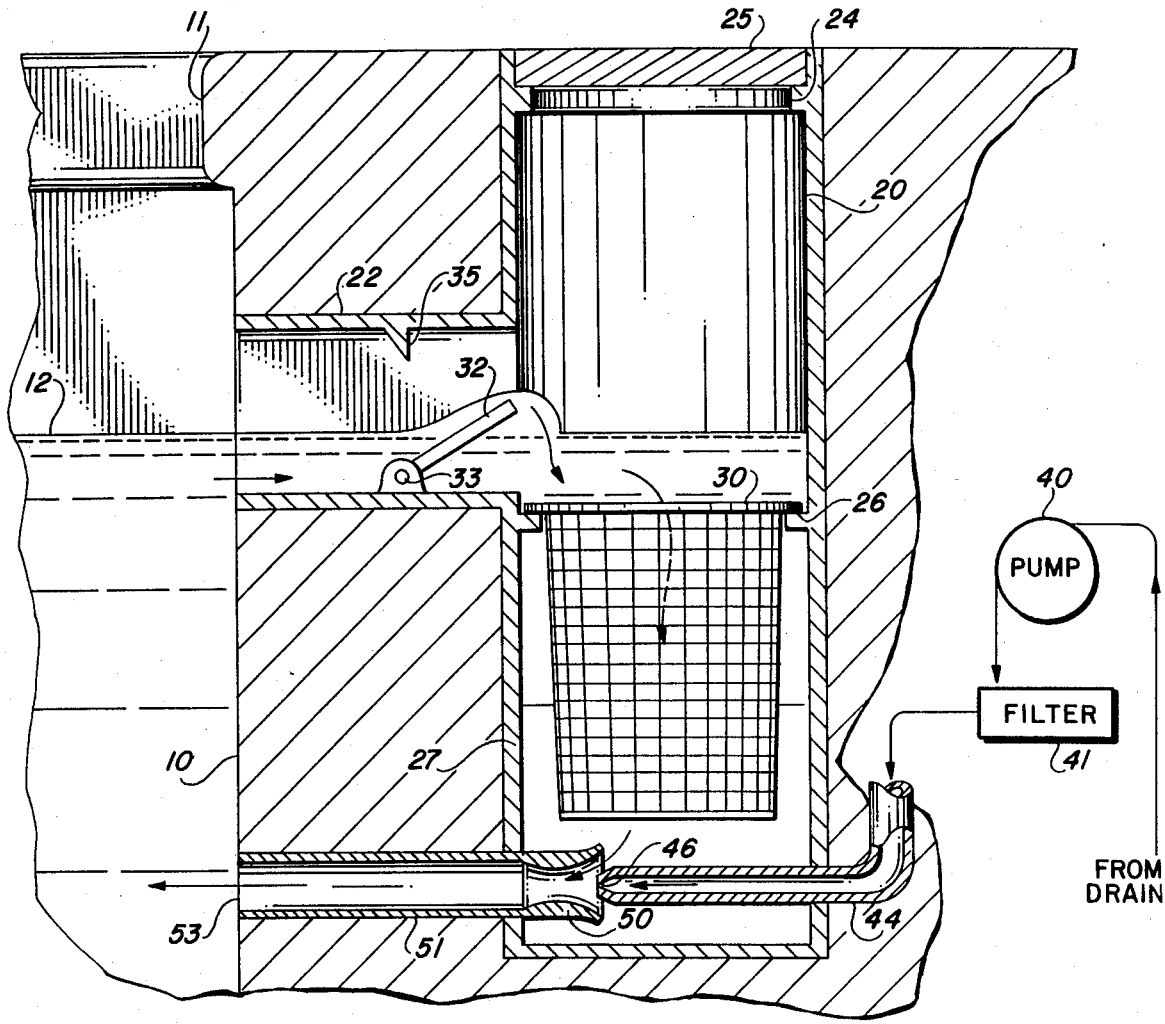
FIG. 1 is a cross sectional view of a preferred embodiment of the invention.

Reference now should be made to the drawing which the same reference numbers are used throughout the different figures to designate the same or similar components. FIG. 1 illustrates, in cross section, a preferred embodiment of the invention employed in conjunction with a standard swimming pool. A portion of the swimming pool is illustrated in the form of the upper part of one of the vertical walls 10 which has a covering 11 around it to minimize the splashing of water out of the pool. Water in the pool typically is maintained at a level 12, as illustrated. A skimmer made in accordance with the invention, is in the form of an elongated cylindrical cavity having an upper portion 20 and a lower portion 27 located a short distance from the wall 10 and typically formed in the concrete which is used to form the wall 10 of the pool. The upper cavity 20 has an annular rim 24 around it to support a cover or lid 25. In normal use, the lid 25 is in place; but it is made to be easily removable for access to a filter basket 30 located or placed within the skimmer.

A water level inlet 22 is provided between the upper chamber 20 of the skimmer and the pool. This inlet extends through the wall 10 and is located so that the water level 12 of the pool typically falls somewhere midway between the upper and lower walls of the inlet 22. This is illustrated in FIG. 1.

The inlet 22 is of conventional construction and includes a floating dam 32, pivoted at its lower end on a pivot 33 for permitting water, leaves and other floating debris to pass from the pool into the inlet 22 over the dam 32 and into the cavity 20 in the direction of the arrows shown. When waves are created in the pool, any reverse water flow which might take place causes the dam 32 to pivot counter-clockwise, as viewed in FIG. 1, to abut the projection 35, preventing debris from being withdrawn from the skimmer and returned to the pool. This is a common construction; and any suitable, conventional structure for accomplishing this purpose may be used.

The upper and lower cavities 20 and 27 of the skimmer are defined by an annular rib 26, which is used to support a conventional leaf basket 30 of the type typically used in leaf skimmers for swimming pools. The basket is suspended by a rim, which engages the rib 26 to extend downwardly into the lower cavity 27 as illustrated in FIG. 1.

Instead of withdrawing water from the bottom of the cavity 27 and supplying it through the recirculating pump and filter of the pool as is typically done, the recirculation system for the pool is arranged to supply the return water to the bottom of the cavity 27. This is exactly the opposite of the standard procedure normally used with skimmers for swimming pools. To accomplish this, the pump 40 for the swimming pool withdraws water for the pool from the drain or other suitable below-water inlets and supplies this water to a filter 41, which is of any standard type normally used in conjunction with swimming pools. The sole return line 44 to the pool from the filter 44, or at least one return line, then extends into the bottom of the cavity 27 beneath the leaf basket 30.

The return line 44 terminates within the bottom of the cavity 27, and has a restricted nozzle 46 at its output to cause the water return through it to exit at relatively high speed. This water is directed through a larger entrainment nozzle 50 attached to a water outlet pipe 51 which opens at an opening 53 into the pool to discharge or supply the return water to the pool. This opening 53 may include a baffle or diverter to direct the water downwardly or laterally around the pool interior to enhance the circulating effect of the water in the pool. The pipe 51 may have the form of a diffuser to improve the efficiency on the entrainment mechanism.

(Insert A) The water jet eminating from the nozzle 46 has a high velocity and therefore high momentum. This momentum is imparted to the water surrounding the nozzle 46 and the water inside the pipe 51. This imparted momentum has the effect of accelerating and entraining additional water from the bottom of the cavity 27 surrounding the entrainment nozzle 50 and the nozzle 46 into the pipe 51 and drawing such additional water through the pipe 51. The result is that water is pulled downwardly through the basket 30 to join with the water from the pump 40 as it passes out of the nozzle 46 for the return to the pool at the outlet 53. The result is a strong constant flow of water through the inlet 22 and the skimmer basket 30 at all times the pump 40 is in operation.

If the skimmer basket 30 should become clogged or should severely restrict the flow of water through it, only a small decrease in water flow is effected at the pump 40, since the water which is being recirculated by the pump 40 is not withdrawn through the basket 30, but is pulled from the drain and is discharged through the pipe 44 in the same manner. Even if the leaf basket 30 becomes completely clogged, so that no water flows through it from the pool, most of the flow of recirculated water through the return pipe 44 still takes place. The return water 44 then flows through the nozzle 50 and the pipe 51 to return to the pool through the opening 53 without being impeded in any significant way.

Figure 2:
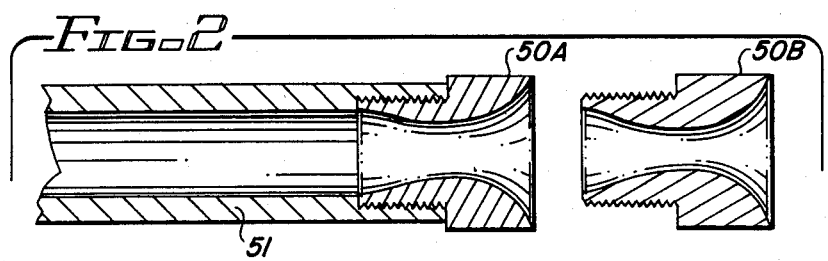
FIGS. 2 and 3 illustrate alternative features which may be used with the embodiment of FIG. 1.
Figure 3:
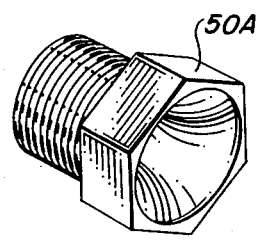

It is possible that different entrainment nozzles 50 may need to be provided in accordance with different characteristics of the pool recirculation system, which could result in different flow rates of the water discharged through the nozzle 46, or other variations in the system. To permit different nozzles to be used with the system, the pipe 51 may be internally threaded at the point where it opens into the bottom of the chamber 27 of the leaf skimmer. The threaded portion may terminate with the vertical wall of the chamber 27 or extend into the chamber somewhat. Then, threaded entrainment nozzle plugs, such as the plugs 50A and 50B illustrated in FIGS. 2 and 3 may be provided in accordance with the operating characteristics which are desired.

Figure 4:
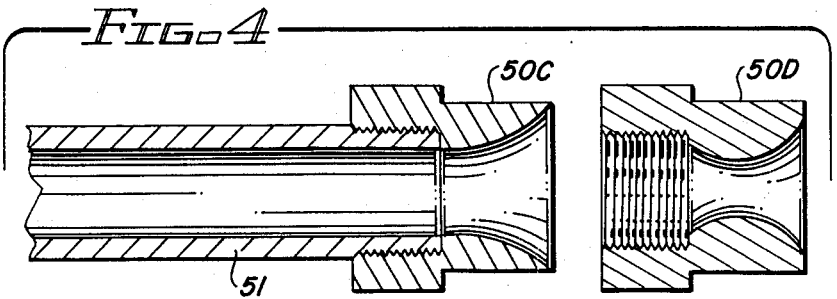
FIGS. 4 and 5 illustrate another alternative of features which my be used with the embodiment of FIG. 1.
Figure 5:
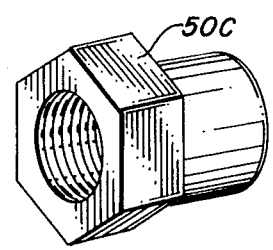

Alternatively, the pipe 51 may be externally threaded and extended a short distance into the bottom chamber 27 below the basket 30. Entrainment nozzles 50C and 50D, having different internal characteristics then may be threaded onto this external projection of the pipe 51, as illustrated in FIG. 4. To facilitate the insertion and removal of these different nozzles 50A through 50D, the nozzles may incorporate, as an integral part thereof, an hexagonal or square head for engagement by a wrench, as illustrated most clearly in FIGS. 3 and 5.

Typical dimensions for the return line 44, nozzle 46, and pipe 51, are for the line 44 to be a ¾ inch pipe with a ½ inch nozzle 46. The pipe 51 then is a 2 and ½ inch diameter pipe, with a suitable entrainment nozzle 50 provided.

The foregoing description and the drawing are to be considered as illustrative of the invention and not as limiting. Various changes and modifications will occur to those skilled in the art without departing from the true scope of the invention. For example, although the leaf skimmer has been shown as a built-in cavity adjacent a pool wall, it could be incorporated as a separate accessory, operating off of the return line for the pool. The particular shapes of the various components also may be varied in accordance with the different requirements of the pool designer without departing from the spirit and scope of the invention. The various relative dimensions which have been given also are illustrative and not limiting.

I claim:

1. A skimmer for a swimming pool having a water recirculation system in it for withdrawing water from a below-water drain and supplying it to a return line after filtering, said skimmer including in combination:

water inlet means opening into the water in a pool for location partially below and partially above the normal surface water level of the pool, so that objects floating on the surface of the water in the pool may enter into said water inlet means;

water outlet means opening into the water in the pool a predetermined distance below the opening of said inlet means;

a skimmer basket cavity substantially vertically oriented between said water inlet means and said water outlet means, with said water inlet means being located near the top of said skimmer basket cavity and said water outlet means located at a point below said water inlet means to return water therefrom to the pool beneath the surface water level thereof after passage of such water through said skimmer basket cavity;

a skimmer basket in said skimmer basket cavity;

water return means for supplying recirculated water from the return line of the pool water recirculation system to the pool;

entrainment nozzle means located in the bottom of the skimmer basket cavity below said skimmer basket and coupling said water return means with said water outlet means for drawing surface water from said inlet means through said skimmer basket cavity to mix such surface water with said water from said water return means and to supply such water mixture to the pool through said water outlet means, the sole water flow path through said skimmer basket cavity being from said water inlet means through said entrainment nozzle means to said water outlet means, such that no water flow through said skimmer basket cavity takes place through the water recirculation system of the pool.

2. The combination according to claim 1 wherein said skimmer basket is removable, with the upper portion of said skimmer basket receiving the surface water of said pool and the lower portion thereof located above said entrainment nozzle, said water return means and said water outlet means.

3. The combination according to claim 2 wherein said skimmer basket cavity is open from the top, adjacent the edge of a swimming pool, with said skimmer basket cavity being substantially parallel to a vertical wall surface of said pool wherein said water inlet means is a substantially horizontal passageway between the wall of said pool and the upper portion of said skimmer basket cavity and wherein said water outlet means is located adjacent the bottom of said cavity below the water surface of said pool and is substantially parallel to said water inlet means.

4. The combination according to claim 3 wherein said entrainment nozzle has a passageway therethrough connected at one end with said water outlet means; and wherein said water return means terminates at the other end of the passageway through said entrainment nozzle to eject water therefrom into said entrainment nozzle, the other end of said passageway through said entrainment nozzle having a diameter greater than the diameter of the water stream exiting from said water return means.

5. The combination according to claim 4 further including means for adjusting said entrainment nozzle.

6. The combination according to claim 1 wherein said skimmer basket cavity is open from the top, adjacent the edge of a swimming pool, with said skimmer basket cavity being substantially parallel to a vertical wall surface of said pool wherein said water inlet means is a substantially horizontal passageway between the wall of said pool and the upper portion of said skimmer basket cavity and wherein said water outlet means is located adjacent the bottom of said cavity below the water surface of said pool and is substantially parallel to said water inlet means.

7. The combination according to claim 1 wherein said entrainment nozzle has a passageway therethrough connected at one end with said water outlet means; and wherein said water return means terminates at the other end of the passageway through said entrainment nozzle to eject water therefrom into said entrainment nozzle, the other end of said passageway through said entrainment nozzle having a diameter greater than the diameter of the water stream exiting from said water return means.

8. The combination according to claim 7 further including means for adjusting said entrainment nozzle.

* * * * *